United States Patent Office 3,640,946
Patented Feb. 8, 1972

3,640,946
FLAME RETARDANT POLYMERS OF PROPYLENE
James C. W. Chien and Robert J. Schwarz, Wilmington, Del., assignors to Hercules Incorporated, Wilmington, Del.
No Drawing. Filed Apr. 29, 1969, Ser. No. 820,330
Int. Cl. C08f 45/04
U.S. Cl. 260—41 B                          4 Claims

ABSTRACT OF THE DISCLOSURE

Flame retardant compositions of polymers of propylene are described. The polymers are rendered flame retardant by addition of 4–10% of a chlorinated polyisobutylene and 0 to 5% of antimony trioxide, the amount of the chlorinated polyisobutylene and antimony trioxide together being 5–15% by weight of the composition.

---

This invention relates to improving the flame retardancy of polymers of propylene without major impairment of the physical and mechanical properties of the polymer and to the improved flame retardant compositions produced thereby.

It has been proposed heretofore to impart flame retardancy to solid polymers by incorporating various chlorinated hydrocarbons and an inorganic flame retardant therein. For example, according to Happoldt, Jr., U.S. 2,480,298 flame retardancy has been obtained in low density polyethylene, by combining with the polyethylene at least 6% of a solid chlorinated hydrocarbon containing 50–85% of chlorine, such as chlorinated paraffin, and 20–35% of antimony trioxide, the combined amount of chlorinated hydrocarbon and antimony trioxide being 38 to 50% by weight of the composition. Such compositions are generally acceptable from the standpoint of flame resistance but have substantially impaired properties due to the inclusion of the large amount of flame retardant materials. These flame-resistant polyethylenes are subject to excessive embrittlement, particularly after natural or accelerated aging. In addition, the high amount of chlorinated paraffin or other organic chlorinated material which is necessary to produce a good degree of flame resistance acts as a viscosity depressant which adversely affects the resistance of the polyethylene composition to deformation under load at elevated temperatures and it increases the tendency of the composition to become brittle. Another disadvantage of these prior art compositions is that the inclusion of the inorganic compound causes a significant increase in the density of the polymer and also renders it opaque.

It has also been proposed in Nelson, IV, U.S. patent No. 3,121,067 to render polyolefins such as polyethylene or polypropylene flame retardant by combining with the polyolefin from 9 to 50% of flame proofing constituents which are a chlorinated polyethylene containing less than 50% chlorine and antimony trioxide, the antimony trioxide constituting at least 2% of the formulation and the chlorinated resin providing 2 to 18% chlorine. While these compositions have improved physical properties over those containing chlorinated wax containing more than 50% chlorine, a loading of at least 18% of the chlorinated polyethylene and antimony trioxide is required to meet the flame retardancy requirements of ASTM D–635 and ASTM D–757 and the Underwriter Laboratory, Inc. test (Standards for Thermoplastic Insulated Wires, 3rd edition, 17 1948). At such loadings, however, the mechanical and electrical properties are still considerably deteriorated.

It is an object of the present invention to provide flame retardant compositions of polymers of propylene using particularly small amounts of flame retardant additives. Another object is to provide compositions which can be molded into articles which meet the various established flame retardancy standards and at the same time have improved physical properties.

Now in accordance with the present invention it has been found that the aforesaid objects can be achieved through the use of compositions which contain 85–95% of a polymer of propylene and a flame retardant consisting essentially of 4–10% of a chlorinated polyisobutylene having a chlorine content of 40 to 70% and 0–5% of antimony trioxide, the amount of the chlorinated polyisobutylene and antimony trioxide together being from 5 to 15%. Preferably, the composition contains a flame retardant consisting essentially of from 5 to 10% of chlorinated polyisobutylene having a chlorine content of 40 to 65% and from 1 to 3% of antimony trioxide by weight of the composition and most preferably from 6 to 10% of chlorinated polyisobutylene having a chlorine content of 40 to 60% and from 1.5 to 2.5% of antimony trioxide.

The flame retardant compositions of the present invention meet the requirements of ASTM D–635 and have a combustion index of at least 0.24, measured according to the method of C. P. Fenimore and F. C. Martin, "Combustion and Flame," 10, 135 (1966). Thus the invention provides flame retardant compositions from propylene polymers with very little or no antimony trioxide and a chlorinated polyisobutylene which furnishes from less than 2% up to about 7% chlorine to the composition. Moreover, because of the small amount of flame retardant constituents required, the compositions have improved physical properties, such as for example, greater impact strength, higher viscosity, improved density, and opacity as compared with the prior art flame retardant compositions containing much larger amounts of chlorinated material and antimony trioxide.

The chlorinated polyisobutylenes useful in the present invention are homopolymers of isobutylene or copolymers thereof with up to about 10% of a copolymerizable monomer such as isoprene, and can be prepared in conventional manner. They are conveniently prepared by chlorinating polyisobutylene, and preferably a polyisobutylene having a molecular weight of at least about 60,000 in solution in an aromatic solvent or chain transfer agent using gaseous chlorine and ultraviolet light as initiator. During chlorination, chain scission occurs and the molecular weight of the polymer is reduced, the degree of reduction being a function of chlorination conditions. At the desired degree of chlorination, the chlorinated polyisobutylene is readily soluble in aromatic and chlorinated hydrocarbon solvents, and is usually a white, friable solid having a molecular weight ranging from about 2,000 to about 20,000 and preferably from about 2,000 to about 5,000.

The polymers of propylene which are made flame retardant in accordance with this invention are homopolymers or random, block or graft copolymers of propylene containing at least 75 mole percent propylene. These polymers usually have molecular weights between about 100,000 and 800,000 or higher and can be produced by well known and conventional methods. Particularly useful are stereoregular or isotactic polypropylenes having a melt index range of at least about 0.3 to 20 and preferably about 3 to 5. Typical comonomers useful for the preparation of propylene copolymers include other α-olefins such as, ethylene, butene-1, 3-methyl butene-1, 4-methyl pentene-1, dodecane-1, styrene, and the like. Typical comonomers which can be grafted to the propylene polymer chain to give a so-called graft copolymer include vinyl acetate, vinyl propionate, the acrylic and methacrylic esters of aliphatic alcohols and the like.

In addition to the chlorinated polyisobutylene and antimony trioxide flame retardants, the compositions of this invention can also contain small amounts of other additives such as stabilizing agents, lubricants, dye additives, pigments, antistatic agents and the like, up to a total of about 5% by weight of the composition provided, of course, that the amount of such additives does not detract from the flame retardancy of the composition.

The compositions of the invention can be prepared by mixing the propylene polymer with the flame retardant, i.e. the chlorinated polyisbutylene and antimony trioxide, if present, in conventional manner, e.g. on roll mills, kneaders or extruders. Since uniform mixing of the constituents is essential to reliable results, the mixing operation is preferably carried out by first dry mixing the ingredients and then subjecting the dry mixture to intensive mechanical working at elevated temperatures above the softening point of the polymer and most conveniently by means of compounding rolls, a Banbury mixer or extruder and continuing the working until a uniform mixture is obtained.

The compositions of the invention are suitable for the production of molded articles by the usual processing methods and are particularly suitable for the production of film, fiber and plastic molded articles.

The invention is further illustrated by the following examples wherein all parts and percentages are by weight unless otherwise specified. Throughout this specification the term "flame retardant" is used to designate a composition or article which will not burn when tested according to ASTM D–635 and will have a combustion index of at least 0.24.

EXAMPLES 1 TO 8

In these examples various molding compositions were made by intimately blending stereoregular polypropylene with the flame retardant(s) on a two-roll mill at 175° C. for 7 minutes and then compression molding the blends into ⅛ inch plaques using a 4,000 p.s.i.g. press at 175° C. The polypropylene used in these examples was a commercial stereoregular polypropylene having a melt index of 4, and an RSV (determined on a 0.1% solution in decahydronaphthalein at 135° C.) of 2.9. The chlorinated polyisobutylenes were prepared from commercial polyisobutylenes (having molecular weights between about 140,000 and 250,000, Staudinger) which were chlorinated in benzene according to the general procedure given above except where noted. The antimony trioxide, when present, in finely divided form and passed a U.S. Standard Sieve No. 200.

Details as to the amount of each component in the compositions and flame retardancy test results on the molded plaques therefrom are given in the following Table I.

EXAMPLE 9

The procedure of Example 7 was repeated except that in this example, the composition contained twice as much chlorinated polyisobutylene. The composition was rated as nonburning according to ASTM D–635. Various physical property determinations were made on the molded plaques of the composition of this example and compared with plaques made from polypropylene which did not contain any chlorinated polyisobutylene (Control C) or plaques made from a polypropylene composition having the same degree of flame retardancy as that of Example 9 but containing as the flame retardant, 27% of Dechlorane (dimerized hexachlorocyclopentadiene containing 21% chlorine) and 13% of antimony trioxide (Control D).

Details as to the amount of each component in the compositions and physical property test results on the molded plaques therefrom are given below in Table 2.

TABLE 2

|  | Ex. 9 | Control C | Control D |
|---|---|---|---|
| Composition (parts by weight): |  |  |  |
| Polypropylene | 90 | 100 | 60 |
| Chlorinated polyisobutylene (50% chlorine) | 10 | | |
| Dechlorane | | | 27 |
| Antimony trioxide | | | 13 |
| Properties: |  |  |  |
| Modulus, p.s.i. (ASTM D–638) | 250,000 | 280,000 | 219,000 |
| Yield point: |  |  |  |
| Stress, p.s.i. | 5,180 | 4,800 | 3,320 |
| Strain, percent | 4.7 | 9.5 | 3.9 |
| Deflection temperature at 264 p.s.i.g., ° C. (ASTM D–648) | 75 | 61 | 80 |
| Falling weight tensile impact, ft. lb./in.² | 20 | 38 | 11 |

The above data demonstrate the advantages of the flame retardant polypropylene compositions of this invention over prior art flame retardant polypropylene compositions having the same degree of flame retardancy. Most outstanding is the fact that a high degree of impact resistance is retained in contrast to the severe loss in impact exhibited by the prior art composition.

What we claim and desire to protect by Letters Patent is:

1. A flame retardant composition comprising a blend of 85 to 95% of a polymer of propylene selected from the group consisting of polypropylene and copolymers containing at least 75 mole percent propylene with ethylenically unsaturated comonomers, and a flame retardant consisting essentially of 4 to 10% of a chlorinated polyisobutylene having a chlorine content of 40 to 70% of and 0 to 50% of antimony trioxide, the amount of the

TABLE 1

| Example No. | Composition | | | | Flame retardancy | |
|---|---|---|---|---|---|---|
|  | Polypropylene (parts) | Chlorinated polyisobutylene | | Antimony trioxide (parts) | Combustion index | Rating (ASTM D–635) |
|  |  | Percent chlorine | Amount (parts) |  |  |  |
| Control A | 80 | 23 | 20 |  | 0.19 | Burning. |
| Control B | 60 | 23 | 40 |  | 0.20 | Do. |
| 1 | 90 | 43 | 10 |  | 0.25 | Nonburning. |
| 2 | 87.5 | 43 | 10 | 2.5 | 0.28 | Do. |
| 3 | 90 | 48 | 10 |  | 0.25 | Do. |
| 4 | 90 | ¹ 64 | 10 |  | 0.25 | Do. |
| 5 | 87.5 | ¹ 64 | 10 | 2.5 | 0.31 | Do. |
| 6 | 95 | ¹ 50 | 4 | 1 | 0.24 | Do. |
| 7 | 95 | ¹ 50 | 5 |  | 0.24 | Do. |
| 8 | 85 | ¹ 50 | 10 | 5 | 0.27 | Do. |

¹ Chlorinated in carbon tetrachloride.

chlorinated polyisobutylene and antimony trioxide together being from 5 to 15%.

2. The composition of claim 1 wherein the propylene polymer is stereoregular polypropylene.

3. The composition of claim 2 wherein the flame retardant consists essentially of 6 to 10% chlorinated polyisobutylene having a chlorine content of 40 to 60% and 0 to 5% antimony trioxide.

4. An article of the composition of claim 1.

References Cited
UNITED STATES PATENTS

| | | | |
|---|---|---|---|
| 3,121,067 | 2/1964 | Nelson | 260—41 |
| 3,374,198 | 3/1968 | Como et al. | 260—41 |

OTHER REFERENCES

Ladocsi et al., Def. Pub. of Ser. No. 657,483, filed August 1967, published in 8570.G.1039 on Dec. 24, 1968–260.5.

MURRAY TILLMAN, Primary Examiner

C. J. SECCURO, Assistant Examiner

U.S. Cl. X.R.

260—41.5 R, 45.75, 889, 897